(Model.)
J. M. CLARK.
ADJUSTABLE AND DETACHABLE HANDLE FOR PLOWS, &c.
No. 267,837. Patented Nov. 21, 1882.
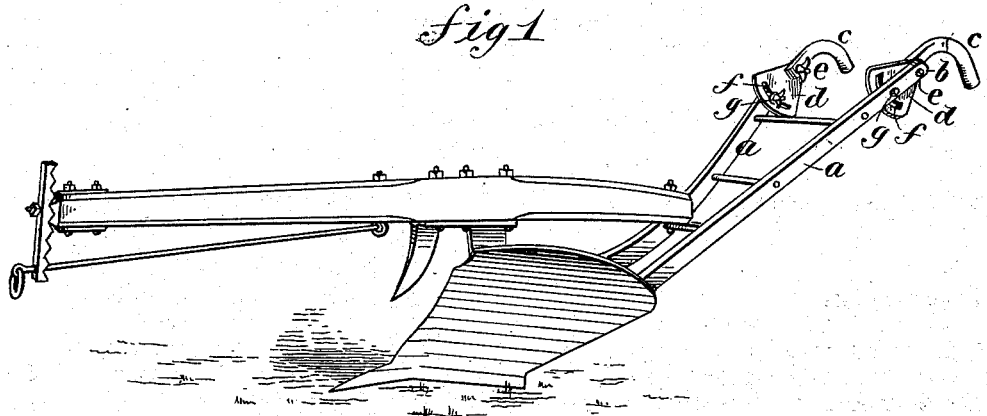
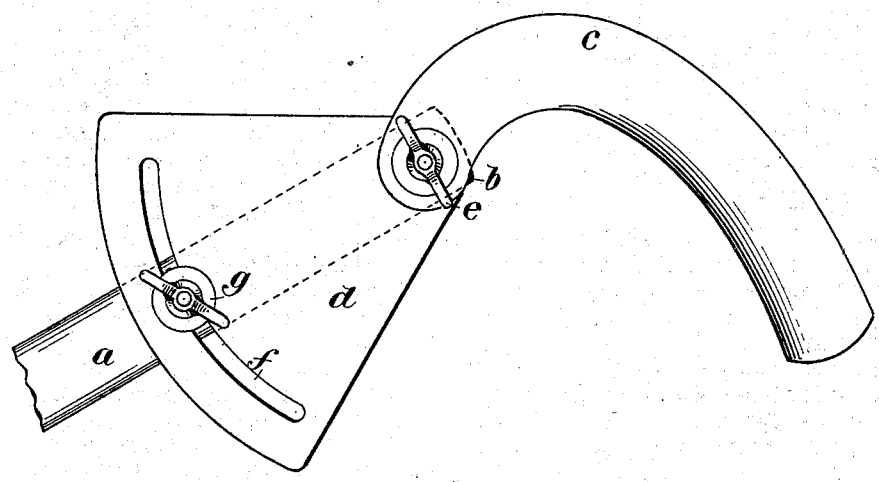
WITNESSES:
J. D. Garfield
C. Sedgwick
INVENTOR:
J. M. Clark
BY
Munn & Co
ATTORNEYS.

UNITED STATES PATENT OFFICE.

JAMES M. CLARK, OF LANCASTER, PENNSYLVANIA.

ADJUSTABLE AND DETACHABLE HANDLE FOR PLOWS, &c.

SPECIFICATION forming part of Letters Patent No. 267,837, dated November 21, 1882.

Application filed July 1, 1882. (Model.)

*To all whom it may concern:*

Be it known that I, JAMES M. CLARK, of Lancaster, in the county of Lancaster and State of Pennsylvania, have invented a new and Improved Adjustable and Detachable Handle for Plows and other Implements, of which the following is a full, clear, and exact description.

My invention consists in the employment of adjustable handles consisting each of a handle and an attaching and adjusting plate, said handles being pivot-bolted to the handle-beam and stay-bolted thereto through slots, whereby it may be applied readily to any plow, harrow, cultivator, or other like implement in use without alteration, except to cut off the ordinary handles to provide handles that may be readily shifted and set high or low to suit the requirements of the person using the implement as to the proper height of the handles from the ground, according as the person is short or tall, all as hereinafter fully described.

Reference is to be had to the accompanying drawings, forming part of this specification, in which similar letters of reference indicate corresponding parts in both the figures.

Figure 1 is a perspective view of a plow with my improved adjustable and detachable handles applied to it. Fig. 2 is a side elevation of an adjustable and detachable handle, and a part of an ordinary handle-beam as contrived and arranged by me, the same being drawn to a larger scale than Fig. 1.

I take any plow, harrow, cultivator, or other implement having the common handles of such implement formed on the upper ends of handle-beams *a*, that are rigidly and permanently attached to the plow or other implement, and cut said handles off at *b*, where the curve of the handles begins, and substitute therefor cast or other metal handles, *c*, having a flat extension-plate, *d*, below the handle, by pivot-bolting said handle at *e* to the side of the handle-beam, near the upper end, and also by stay-bolting plate *d* to said handle-beam through curved slot *f*, with the bolt *g* below bolt *e*, on which the handle *c* may swing up and down to alter the height as required when the bolts are slack. After shifting the handles to the desired height the bolts are to be tightened up to secure the handles until it is required to shift them again.

It will be seen that by taking out the bolts the handles may be readily taken off and as readily applied to another machine, so that if desired one pair of handles will serve for several machines.

I prefer to make my improved handles of cast-iron, by which they can be furnished at very little cost, so that as it only needs the boring of a couple of holes to each handle and the provision of two bolts and nuts, it will be seen that the handles can be cheaply applied to any and all machines, whether old or new.

I am aware that handle-beams have been connected to the plow, harrow, and other machine beams, frames, or other parts for adjustment; but that is not so desirable an arrangement as mine, because it requires much stronger and more substantial connections, owing to the leverage of the handle-beams, and, besides, such joints are not so conveniently located for attention and adjustment as in my arrangement.

Having thus fully described my invention, I claim as new and desire to secure by Letters Patent—

The combination, with the handle-beam of a plow or other implement, of handle *c*, having slotted attaching and adjusting plate *d*, said handle being pivot-bolted to the handle-beam at *e* and stay-bolted through slot *f*, as described.

JAMES M. CLARK.

Witnesses:
A. F. SHENCK,
H. CARPENTER.